US008282155B2

(12) United States Patent
Hallik et al.

(10) Patent No.: US 8,282,155 B2
(45) Date of Patent: Oct. 9, 2012

(54) MOTOR VEHICLE FRONT END AND METHOD FOR PRODUCING A MOTOR VEHICLE FRONT END

(75) Inventors: Matthias Hallik, Wiesbaden (DE); Oliver Schütz, Nauheim (DE); Stephan Rosenplänter, Sulzheim (DE); Stefan Gloger, Mühltal (DE)

(73) Assignee: GM Global Technology Operations LLC, Detroit, MI (US)

( * ) Notice: Subject to any disclaimer, the term of this patent is extended or adjusted under 35 U.S.C. 154(b) by 77 days.

(21) Appl. No.: 12/845,334

(22) Filed: Jul. 28, 2010

(65) Prior Publication Data
US 2011/0025095 A1 Feb. 3, 2011

(30) Foreign Application Priority Data

Jul. 28, 2009 (DE) .................. 10 2009 034 905

(51) Int. Cl.
*B60N 99/00* (2006.01)
(52) U.S. Cl. .......... 296/203.02; 296/203.01; 296/187.09
(58) Field of Classification Search ............ 296/203.01, 296/203.02, 205, 187.09, 187.1, 193.03
See application file for complete search history.

(56) References Cited

U.S. PATENT DOCUMENTS

| | | | | |
|---|---|---|---|---|
| 3,909,058 A | * | 9/1975 | Kramer et al. | 296/187.09 |
| 3,939,934 A | * | 2/1976 | Barenyi | 296/203.01 |
| 4,618,163 A | * | 10/1986 | Hasler et al. | 296/203.03 |
| 6,874,843 B2 | | 4/2005 | Awano et al. | |
| 6,880,663 B2 | * | 4/2005 | Fujiki et al. | 296/187.09 |
| 7,008,006 B2 | * | 3/2006 | Steinhauser et al. | 296/187.09 |
| 7,040,446 B2 | * | 5/2006 | Anzai et al. | 296/187.09 |
| 2005/0077754 A1 | | 4/2005 | Tomita | |

FOREIGN PATENT DOCUMENTS

| | | |
|---|---|---|
| DE | 10235382 A1 | 2/2004 |
| DE | 10236982 A1 | 2/2004 |
| DE | 10240474 A1 | 3/2004 |
| DE | 10338389 A1 | 3/2005 |
| DE | 102005050951 A1 | 5/2007 |
| DE | 20321813 U1 | 7/2010 |
| EP | 0963414 A1 | 12/1999 |
| EP | 1081024 A2 | 3/2001 |
| EP | 1389575 A2 | 2/2004 |

OTHER PUBLICATIONS

British Patent Office, British Search Report for British Application No. 1012541.7, Nov. 18, 2010.

* cited by examiner

*Primary Examiner* — Lori Lyjak
(74) *Attorney, Agent, or Firm* — Ingrassia Fisher & Lorenz, P.C.

(57) ABSTRACT

A motor vehicle front end and a method for producing a motor vehicle front end are provided in accordance with embodiments of the invention. The motor vehicle front end has a front wall and the front wall girder, the front wall girder essentially being situated in the direction of a vehicle transverse axis. In addition, the motor vehicle front end has a first front wall girder, the first front wall girder being situated essentially in the direction of a vehicle vertical axis. The first front wall girder is supported on the front wall crossbeam in a first area of the front wall crossbeam.

15 Claims, 2 Drawing Sheets

MOTOR VEHICLE FRONT END AND METHOD FOR PRODUCING A MOTOR VEHICLE FRONT END

CROSS-REFERENCE TO RELATED APPLICATION

This application claims priority to German Patent Application No. 102009034905.7, filed Jul. 28, 2009, which is incorporated herein by reference in its entirety.

TECHNICAL FIELD

The invention relates to a motor vehicle front end and a method for producing a motor vehicle front end.

BACKGROUND

The construction of a motor vehicle front end is very complex because of statutory provisions, in particular for occupant protection. A motor vehicle front end having two laterally situated longitudinal girders, whose outer sides are each connected to a wheel well having a spring strut receptacle for the spring strut a wheel suspension, is known from EP 1 081 024 A2. The particular spring strut receptacle is welded to a side part of a bulkhead wall, so that a radiator tank is closed on the bottom, and is connected to the upper end of a rear wheel well strut of a wheel well.

A front wall stiffener of a vehicle body, in particular for a passenger automobile, is known from DE 103 38 389 A1, which is to ensure an intrusion-secure support of the front wall in case of a vehicle crash. For this purpose, in each of a total of two longitudinal girders, a front longitudinal girder area lying in front of the front wall is connected to a longitudinal girder area lying behind the front wall in such a manner, using a vertical front wall girder running up to a crossbeam provided in the wind deflector area, that total forces acting in the event of a vehicle crash via the front longitudinal girder area on the front wall may be deflected via multiple force pathways into the vehicle body, so that a front wall intrusion into the passenger compartment is reliably prevented. The two front wall girders are each fixedly connected to an area of an assigned floor longitudinal girder, which adjoins the front wall from the rear.

However, the front crash designs, i.e., the designs on the motor vehicle front end in case of a frontal impact of the motor vehicle, have contrary requirements for North America and Europe. While the front wall intrusion is to be kept particularly low for the European market, in North America a lower deceleration pulse is the most important design criterion. The front wall penetration typically rises when the deceleration pulse decreases and vice versa. Therefore, the front wall stiffener known from the prior art is not capable of fulfilling the requirements of both the European and also the North American markets. A compromise of the two requirements results in a higher weight in the common architectures.

At least one object of the invention is to specify a motor vehicle front end and a method for producing a motor vehicle front end which offers an optimum structure in each case for the two opposing requirements, the motor vehicle front end additionally having the lowest possible weight and the fewest possible framing changes being performed. In addition, other objects, desirable features and characteristics will become apparent from the subsequent summary and detailed description, and the appended claims, taken in conjunction with the accompanying drawings and this background.

SUMMARY

According to an embodiment of the invention, a motor vehicle front end is provided, which has a front wall and a front wall crossbeam, the front wall crossbeam being situated essentially in the direction of a vehicle transverse axis. In addition, the motor vehicle front end has a first front wall girder, the first front wall girder being situated essentially in the direction of a vehicle vertical axis. In addition, the first front wall girder is supported on the front wall crossbeam in a first area of the front wall crossbeam. The first front wall girder can be implemented as a hinged column strut.

This motor vehicle front end has the advantage that with the aid of the selected structural concept in the form of the front wall crossbeam and the first front wall girder, a front frame structure of the motor vehicle is optimally supported against front wall penetrations in the case of a frontal impact of the motor vehicle. However, the first front wall girder does not support the front frame directly, as is known from the prior art, but rather only indirectly via the interposed front wall crossbeam, which yields locally to pressure. The motor vehicle front end according to an embodiment of the invention thus represents a light structure which is prepared for high crash loads, and which can be adapted for various market requirements through very simple adaptation of the rigidity of the structure.

In a particularly preferred design of the motor vehicle front end according to an embodiment of the invention, a reinforcement element is situated in the first area of the front wall crossbeam. The reinforcement element can be implemented as a bulkhead.

In an advantageous embodiment, the rigidity of the reinforcement element is adapted to requirements with respect to a front wall penetration or a deceleration pulse during a frontal impact of the motor vehicle. For this purpose, the reinforcement element can be implemented as a rigid bulkhead, which is situated in the first area of the front wall crossbeam. A collapse of the front wall crossbeam is thus prevented and the least possible front wall penetration is ensured corresponding to the requirements in Europe. For the North American requirements, the bulkhead can be implemented as softer, so that it is still rigid enough to stabilize the front frame at an early crash instant, but makes a collapse of the front wall crossbeam possible at a later crash instant. The deceleration pulse can thus be reduced at the cost of a slightly greater front wall penetration corresponding to the North American requirements. Overall, an adaptation of the motor vehicle front end to the various requirements in case of a frontal impact of the motor vehicle is further improved in an advantageous manner.

In one embodiment, the reinforcement element comprises a steel plate. In an alternative embodiment, the reinforcement element comprises a plastic. It is particularly preferable that the plastic is fiber-reinforced. In all listed embodiments, the lowest possible weight for the motor vehicle front end according to an embodiment of the invention is advantageously achieved.

The reinforcement element can be connected to the front wall crossbeam via a screw connection. In addition, the front wall crossbeam can have an upper cover plate, in a particularly preferred embodiment, the reinforcement element and the upper cover plate being implemented in one piece. A particularly simple installation of the reinforcement element and optionally the upper cover plate of the front wall crossbeam is thus ensured.

In one embodiment of the motor vehicle front end according to the invention, a first end area of the first front wall girder is connected to the front wall. In a further embodiment, a second area of the first front wall girder is connected to a side part of the front wall. Both embodiments advantageously allow secure attachment of the first front wall girder and optimal support of the front frame structure against front wall penetrations during a frontal impact of the motor vehicle.

In a further embodiment, the motor vehicle front end has a second front wall girder, the second front wall girder being situated essentially in the direction of the vehicle vertical axis. The second front wall girder is supported on the front wall crossbeam in a second area of the front wall crossbeam. The second front wall girder is preferably situated diametrically opposite to the first front wall girder in the direction of the vehicle transverse axis. The provision of a second front wall girder advantageously enhances the properties of the motor vehicle front end with respect to the front wall penetration or the deceleration pulse during a frontal impact of the motor vehicle.

In a particularly preferred embodiment, the motor vehicle is a passenger automobile.

Furthermore, embodiments of the invention relate to a method for producing a motor vehicle front end, the method having the following steps. A front wall is produced and a front wall crossbeam is produced. In addition, the front wall crossbeam is situated essentially in the direction of a vehicle transverse axis. Moreover, a first front wall girder is produced and the first front wall girder is situated essentially in the direction of a vehicle vertical axis. The first front wall girder is supported on the front wall crossbeam in a first area of the front wall crossbeam.

The method according to an embodiment of the invention advantageously allows an adaptation to the differing requirements with respect to a front wall penetration or a deceleration pulse in case of a frontal impact of the motor vehicle, the motor vehicle front end having a low weight and the production method only requiring slight or even no framing changes. This results in a significant reduction of the production costs.

In a particularly preferred design of the method according to the invention, a reinforcement element is situated in the first area of the front wall crossbeam, the reinforcement element being selected in such a manner that the rigidity of the reinforcement element is adapted to requirements with respect to a front wall penetration or a deceleration pulse during a frontal impact of the motor vehicle. The reinforcement element can be implemented as a bulkhead.

In one embodiment, the reinforcement element is situated in the first area of the front wall crossbeam during the framing of the motor vehicle front end. This advantageously results in only slight framing changes. It is particularly preferred if the reinforcement element is first introduced in the so-called "general assembly." No framing changes are thus required. The reinforcement element is particularly preferably installed, preferably screwed in, together with an upper cover plate of the front wall crossbeam in the motor vehicle front end. This results in a further simplified installation of the reinforcement element.

In a particularly preferred embodiment, the motor vehicle is a passenger automobile.

BRIEF DESCRIPTION OF THE DRAWINGS

The present invention will hereinafter be described in conjunction with the following drawing figures, wherein like numerals denote like elements.

DETAILED DESCRIPTION

Figure 1A:
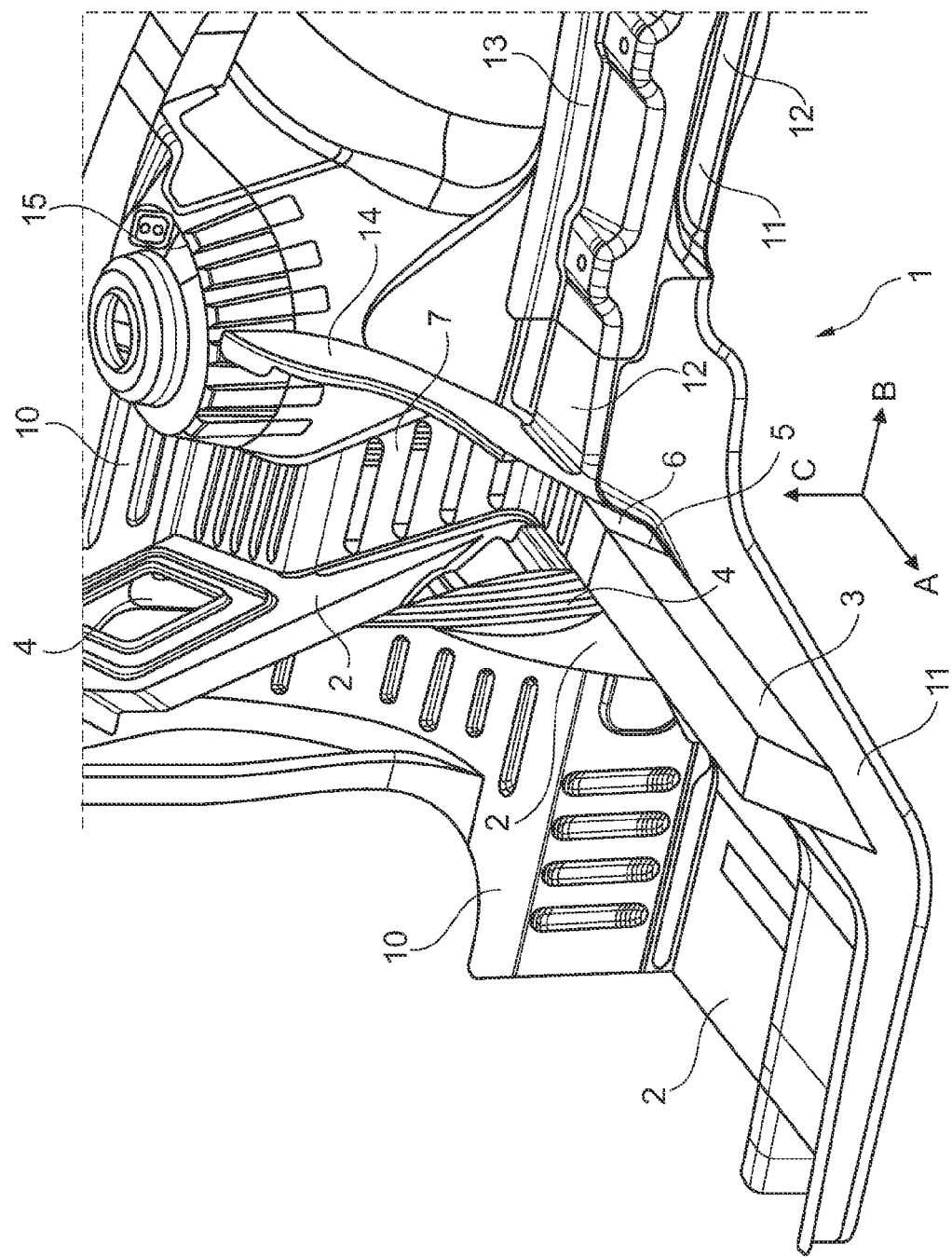
FIG. 1A shows a schematic partial area of a motor vehicle front end according to an embodiment of the invention.

The following detailed description is merely exemplary in nature and is not intended to limit application and uses. Furthermore, there is no intention to be bound by any theory presented in the preceding background or summary or the following detailed description.

The motor vehicle front end 1 has a front wall 2. In addition, the motor vehicle front end 1 has a front wall crossbeam 3, the front wall crossbeam 3 being situated essentially in the direction of a vehicle transverse axis indicated by the arrow direction A. In addition, the motor vehicle front end 1 has a first front wall girder 4, which is implemented in the embodiment shown as a hinged column strut. The first front wall girder 4 is situated essentially in the direction of a vehicle vertical axis indicated by the arrow direction C. In addition, the first front wall girder 4 is supported on the front wall crossbeam 3 in a first area 5 of the front wall crossbeam 3.

A reinforcement element 6 is situated in the first area 5 of the front wall crossbeam 3. The reinforcement element 6 is implemented as a bulkhead in the embodiment shown. The rigidity of the reinforcement element 6 is adapted to requirements with respect to a front wall penetration or a deceleration pulse during a frontal impact of the motor vehicle. The reinforcement element 6 can be implemented from a steel plate or a plastic, preferably a fiber-reinforced plastic. In a way not shown in greater detail, the reinforcement element 6 is connected to the front wall crossbeam 3 via a screw connection.

In the embodiment shown, the front wall crossbeam 3 additionally has an upper cover plate 7. The reinforcement element 6 and the upper cover plate 7 may be implemented in one piece.

With the aid of the selected structural concept in the form of the front wall crossbeam 3 and the first front wall girder 4, which is implemented in the embodiment shown as a hinged column strut, the motor vehicle front end 1 or the front frame is supported optimally against front wall penetrations corresponding to the European requirements. The hinged column strut does not support a front frame 11 directly, as known from the prior art, but rather only indirectly via the interposed front wall crossbeam 3, which yields locally to pressure. For the European market, the front wall crossbeam 3 is reinforced at this position, which forms the first area 5 of the front wall crossbeam 3, by the reinforcement element 6, which is implemented as a rigid bulkhead, for example. A collapse of the front wall crossbeam 3 is thus prevented and the most minimal front wall penetration is ensured. For the North American market, the reinforcement element 6 is implemented as a softer bulkhead, which is still stiff enough to stabilize the front frame 11 at an early crash instant, but makes a collapse of the front wall crossbeam 3 possible at a later crash instant. The deceleration pulse or crash pulse can thus easily be reduced at the cost of higher front wall penetrations corresponding to the North American requirements. Overall, the motor vehicle front end 1 thus allows a light structure, which is prepared for high crash loads, which can be adapted by very simple rigidity tuning of the structure to various market requirements.

Figure 1B:
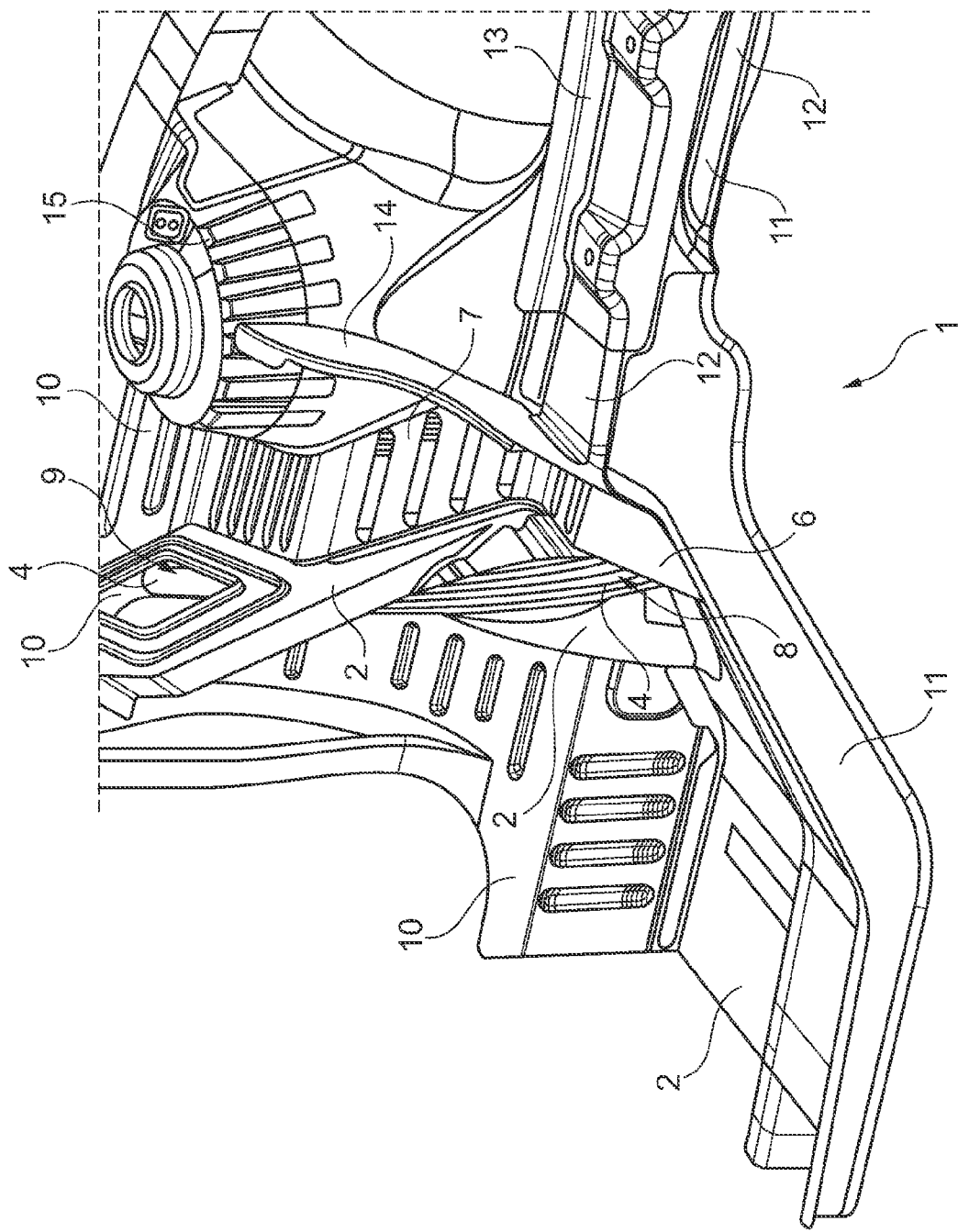
FIG. 1B shows a schematic partial area of a motor vehicle front end according to an embodiment of the invention.

For more precise illustration of the configuration of the first front wall girder 4, the front wall crossbeam 3 is not shown in FIG. 1B. As shown in FIG. 1B, a first end area 8 of the first front wall girder 4 is connected to the front wall 2. In addition, a second end area 9 of the first front wall girder 4 is connected to a side part 10 of the front wall 2. This allows a reliable attachment of the first front wall girder 4 inside the motor vehicle front end 1.

In addition, a first longitudinal girder 12 of the front frame 11 is shown in FIG. 1A and FIG. 1B, which is essentially situated in the direction of the vehicle longitudinal axis indicated by the arrow direction B. A receptacle 13 for an engine bearing (not shown in greater detail) is situated on the first longitudinal girder 12. In addition, the motor vehicle front end 1 has a radiator tank 14 and a spring strut dome 15.

A method for producing the motor vehicle front end 1 has the following steps. The front wall 2 and the front wall crossbeam 3 are produced. The front wall crossbeam 3 is situated essentially in the direction of the vehicle transverse axis. In addition, the first front wall girder 4 is produced and the first front wall girder 4 is situated essentially in the direction of the vehicle vertical axis. The first front wall girder 4 is supported on the front wall crossbeam 3 in the first area 5 of the front wall crossbeam 3.

In addition, the reinforcement element 6 is situated in the first area 5 of the front wall crossbeam 3, the reinforcement element 6 being selected in such a manner that the rigidity of the reinforcement element 6 is adapted to requirements with respect to a front wall penetration or a deceleration process during a frontal impact of the motor vehicle.

The reinforcement element 6 in the form of a bulkhead can already be installed during the framing of the motor vehicle front end 1. Only minimal framing changes are required for this purpose. Ideally, the reinforcement element 6 is first installed, for example, screwed in, in the form of a bulkhead together with the upper cover plate 7 of the front wall crossbeam 3 after the framing. No framing changes are thus required, whereby the costs of the production method may be significantly reduced.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle front end, comprising:
   a front wall crossbeam situated essentially in a first direction of a vehicle transverse axis; and
   a first front wall girder situated essentially in a second direction of a vehicle vertical axis and supported on the front wall crossbeam in a first area, wherein a reinforcement element is situated in the first area of the front wall crossbeam, and wherein a rigidity of the reinforcement element is adapted to a requirement with respect to a deceleration pulse or a front wall penetration during a frontal impact.

2. The motor vehicle front end according to claim 1, wherein the first front wall girder is a hinged column strut.

3. The motor vehicle front end according to claim 1, wherein the rigidity of the reinforcement element is adapted to the requirement with respect to the deceleration pulse during the frontal impact.

4. The motor vehicle front end according to claim 1, wherein the rigidity of the reinforcement element is adapted to the requirement with respect to the front wall penetration during the frontal impact.

5. The motor vehicle front end according to claim 1, wherein the reinforcement element comprises a steel plate.

6. The motor vehicle front end according to claim 1, wherein the reinforcement element comprises a plastic.

7. The motor vehicle front end according to claim 6, wherein the plastic is fiber-reinforced.

8. The motor vehicle front end according to claim 1, wherein the reinforcement element is connected to the front wall crossbeam via a screw connection.

9. The motor vehicle front end according to claims 1, wherein the front wall crossbeam has an upper cover plate.

10. The motor vehicle front end according to claim 9, wherein the reinforcement element and the upper cover plate are implemented in one piece.

11. The motor vehicle front end according to claim 1, wherein the reinforcement element is implemented as a bulkhead.

12. The motor vehicle front end according to claim 1, wherein a first end area of the first front wall girder is connected to a front wall.

13. The motor vehicle front end according to claim 12, wherein a second end area of the first front wall girder is connected to a side part of the front wall.

14. A method for producing a motor vehicle front end, comprising:
   producing a front wall;
   producing a front wall crossbeam;
   situating the front wall crossbeam essentially in a first direction of a vehicle transverse axis;
   producing a first front wall girder; and
   situating the first front wall girder essentially in a second direction of a vehicle vertical axis, the first front wall girder being supported on the front wall crossbeam in a first area of the front wall crossbeam, wherein a reinforcement element is situated in the first area of the front wall crossbeam, the reinforcement element selected in such a manner that a rigidity of the reinforcement element is adapted to a requirement with respect to a front wall penetration during a frontal impact.

15. A method for producing a motor vehicle front end, comprising:
   producing a front wall;
   producing a front wall crossbeam;
   situating the front wall crossbeam essentially in a first direction of a vehicle transverse axis;
   producing a first front wall girder; and
   situating the first front wall girder essentially in a second direction of a vehicle vertical axis, the first front wall girder being supported on the front wall crossbeam in a first area of the front wall crossbeam, wherein a reinforcement element is situated in the first area of the front wall crossbeam, the reinforcement element selected in such a manner that a rigidity of the reinforcement element is adapted to a requirement with respect to a deceleration pulse during a frontal impact.

* * * * *